United States Patent [19]
Kuga et al.

[11] Patent Number: 5,280,573
[45] Date of Patent: Jan. 18, 1994

[54] DOCUMENT PROCESSING SUPPORT SYSTEM USING KEYWORDS TO RETRIEVE EXPLANATORY INFORMATION LINKED TOGETHER BY CORRELATIVE ARCS

[75] Inventors: Shigeki Kuga, Nara; Taro Morishita, Soraku; Masahiro Wada, Ota; Hiroyuki Kanza, Soraku; Satoshi Onishi, Yokohama, all of Japan

[73] Assignee: Sharp Kabushiki Kaisha, Osaka, Japan

[21] Appl. No.: 491,693

[22] Filed: Mar. 12, 1990

[30] Foreign Application Priority Data

Mar. 14, 1989 [JP] Japan .................................. 1-62885

[51] Int. Cl.$^5$ .............................................. G06F 15/62
[52] U.S. Cl. ..................................... 395/145; 395/155; 395/160; 395/147; 395/146; 364/419.14
[58] Field of Search ........ 364/518–521, 409, 200–900, 419; 395/145–147, 155–161, 144, 600

[56] References Cited

U.S. PATENT DOCUMENTS

4,885,717 12/1989 Beck et al. .................... 364/900 M
4,924,387 5/1990 Jeppesen ........................... 364/409
4,980,855 12/1990 Kojima ........................... 364/900 M Primary Examiner—Heather R. Herndon
Assistant Examiner—Almis Jankus
Attorney, Agent, or Firm—Nixon & Vanderhye

[57] ABSTRACT

Method and apparatus are provided for editing input information. Input information is received from an input means (1) from which a keyword is selected for editing purposes. A low level record is located in a memory (5) which has the keyword of the input information stored therein. The low level record having the keyword stored therein is accessed to determine the location in the memory of higher level records and information types of the higher level records. The higher level records having stored therein explanatory information for the keyword in accordance with the information types of the higher level records. The higher level records are of a plurality of information types for presenting different types of explanatory information regarding the keyword, such as a definition of the keyword, a synonym for the keyword, an example usage of the keyword, etc. A display (55) is provided with an indication of the information types stored in the memory for the keyword so that a user can select a desired information type. The explanatory information associated with the desired information type is then displayed to the user, thereby facilitating the user's decision whether the keyword is properly used in the input information.

20 Claims, 7 Drawing Sheets

| 24 | 25 | 26 |
|---|---|---|
| CHARACTERS | DICTIONARY | <ARC MANAGEMENT INFORMATION> |

FIG. 5

| 27 | 28 |
|---|---|
| 4 | <INFORMATION OF EACH ARC> |

FIG. 6

| 29 | 30 | 31 | 32 | 30 | 31 | 32 | 30 | 31 | 32 | 30 | 31 | 32 |
|---|---|---|---|---|---|---|---|---|---|---|---|---|
| 0 | USAGE | 1000 | 200 | SYNONYM | 2000 | 100 | MEANING | 3000 | 300 | DICTIONARY | 4000 | 200 |
| | | | | RELATED WORD | | | | | | | | |

FIG. 7

| 33 | 34 | 35 |
|---|---|---|
| 0 | USAGE | → |

DOCUMENT PROCESSING SUPPORT SYSTEM USING KEYWORDS TO RETRIEVE EXPLANATORY INFORMATION LINKED TOGETHER BY CORRELATIVE ARCS

BACKGROUND OF THE INVENTION

1. Field of the Invention

The present invention relates to a document-creating support apparatus for creating various documents such as a business document, manual, report, literary writing and the like. The documents which can be created by the apparatus of the present invention are compatible with multimedia documents which include not only character strings but also images, sounds or the like.

2. Description of the Prior Art

Japanese word processors (referred to as "word processor" hereinafter) have been commercially available, and basic technology has been developed for inputting-/outputting Japanese, for editing, for Japanese alphabet-Chinese character conversion, for dictionary function, etc.

A document processing system such as a word processor, personal computer, work station and the like which support proofreading and revising a document (created by the word processor or another processing means) has also been developed.

Further, basic technology of mutual data converting among multimedia has been established, where a character string is converted into a sound, a sound is converted into a character string, and a character string is converted into a figure, or vise versa.

A communication technology has been also established whereby a document created by a device is converted into electric signals for transmission to another device, or wherein the devices control each other.

The base of a knowledge processing technology has been established where knowledge and know-how are stored as a knowledge data base.

Although the conventional technology has been described centering on document processing, more expansive technology related to the work station has been established. In this regard, a device employing a multi-window scheme to enhance labor effectiveness has been commercially available.

The base of the technology of creating a document by using these devices and technology has been established.

In recent years, word processors have been widely used, and documents created by these devices are increasing. More advanced word processors capable of inputting, outputting, editing, proofreading and revising a document have also been commercially available to create a document. As used herein, "proofread" includes revising and correcting.

Unexamined Japanese Patent Publication No. 117621/1984 discloses a document editing and proofreading system capable of using common editing and proofreading commands for different kinds of data such as a figure, an image and a writing. Also, Unexamined Japanese Patent Publication No. 127137/1984 discloses a means capable of finding miswritten and omitted words in the document which has a characteristic that the boundary of written words is indefinite, for automatically correcting the miswritten and omitted words.

To illustrate disadvantages in the prior art, an explanation will be presented on the operation of a currently commercially available document processing apparatus having a proofreading support function (referred to as "document-proofreading support apparatus" or simply as "proofreading support apparatus" hereinafter. Proofreading of a document is a step in creating the document, and the document-proofreading support apparatus sometimes means the document-creating support apparatus in the explanation.) This apparatus has not been widely used compared with the word processors, and therefore it will be explained in detail.

There are mainly two ways of proofreading in this document-proofreading support apparatus. One is the way of analyzing the appearance of written words in a character string and extracting a part to be revised. The other is the way of utilizing recently developing high language processing technology, such as morphology analysis, structure analysis and meaning analysis. The device for analyzing the appearance of written words does not employ a large-scale dictionary for analysis, and hence it has the advantage that the program is simple, processing speed is high and memory capacity is small. On the other hand, the appearance analyzing device also has the disadvantage that the accuracy in extracting the part to be proofread is unsatisfactory. In other words, in this system, the part to be proofread is extracted by comparing the inputted character string with a registered character string in the memory. Accordingly, the device has no capability of extracting the part to be proofread for a character string that has not been registered. In addition, if the character string alone has been simply registered, the part not to be proofread may often be extracted by mistake instead of the part to be proofread.

On the other hand, the device capable of effecting high-level language processing has disadvantages. For example, it requires a large scale dictionary and processing program, its processing speed is low and memory requirement is large. On the other hand, the high-level processing device has the advantage of high accuracy in extracting the part to be proofread. Namely, in high-level language processing, phenomena having the same function receive indices of the same classification, or are grouped into clusters of respective patterns, whereby variety of phenomena can be extracted. Although this and the aforementioned devices are distinguished from each other in view of extraction of the part to be proofread, they can be distinguished based upon the capability of proofreading incorrect parts.

In the method of analyzing the appearance of written words, since words are replaced only by checking up the character string, errors may occur each time the proofreading step is carried out when a character string having the small number of characters is replaced with that having the large number of characters.

In contrast to the method of analyzing the appearance of written words, the device effecting the high-level language processing provides accurate proofreading even if the proofreading is repeated many times. This results from the fact that the high-level device has a capability of recognizing that the long character string is a symbol of a long sound.

The commercially available document-proofreading support apparatus having a high-level language processing function has basically proofreading supporting functions as state below as (a) to (g).

(a) Declensional kana (japanese alphabet) ending is standardized based upon the reference. For example, if an expression " あтгラ " appears in a sentence, the part of " 行'くう " is pointed out while the standardized style of the word, " くし ", is presented to take the appropriate alternative in the sentence.

(b) Superfluous and omitted characters are pointed out. For example, when " 学校行きます " is miswritten as " 学校へ行きます ", the apparatus indicates that a character is omitted between " 学校 " and " 行きます " to urge the user to input the character.

Abominable words, difficult words and classical expressions (if any) are pointed out, and they are replaced with appropriate, plain words.

(c) A sentence which does not corresponding to the reference style is pointed out and standardized, when various styles of sentences make up the document. Disproportion in brackets and missing brackets are pointed out, and correct ones are presented to take them in the sentence.

(d) A sentence having a syntactically vague structure is pointed out to urge the user to revise.

(e) Discord in use of an adverb and superfluous use of passive voice are pointed out to urge the user to revise.

(f) A proper noun and a numeral are pointed out to call the user's attention.

(g) Inappropriate expressions which are particularly prone to frequently appear and misuse of words having the same sounds but different characters are pointed out, and the appropriate alternative is presented to take it in the sentence.

The above-mentioned functions are major ones of the proofreading support apparatus which has been widely used in this way.

Two expressions, "to take the alternative in the sentence" and "to urge the user to revise", are used in the above explanation of the function of the apparatus. "To take the alternative in the sentence" means that the apparatus understands what is wrong and how it should be improved; the appropriate alternatives for improvement are displayed on the window or the like; and, that the operator chooses one of the alternatives to replace the inappropriate part in the sentence with the appropriate alternative. "To urge the user to revise" means that the apparatus senses that something is probably wrong but not tell how it should be corrected. These expressions are distinguished in accordance to the technical level of the current proofreading support apparatus, and if the language processing technique is more advanced, the step "to urge the user to revise" may be upgraded to the step "to take the alternative in the sentence" in future.

However, in any case, a man having a good knowledge must ultimately judge, select words and phrases or revise. In this sense of the words, the current document proofreading apparatus should be more appropriately termed document-proofreading support apparatus.

Such a document-proofreading support apparatus has the following disadvantages.

With the conventional proofreading support apparatus, although a part to be proofread and the alternatives for improvement are presented, the reason why it should be proofread and improved in such a way is not presented.

This means that if the user does not understand the difference between the alternatives, he or she may select an inappropriate one by mistake (if several alternatives for improvement are presented).

Even if there is only one alternative, decisions must be made whether or not it is to be improved in such a way as that the apparatus indicates. Moreover, there still is a risk that the improvement according to the indication of the apparatus leads reversely to an undesirable revision of the correct part to an inappropriate word or phrase.

Thus, if effective information and further information are required for distinguishing an alternative from the other in revising, the conventional apparatus does not have desirable function to solve the problem.

The apparatus can not distinguish one mistake from another in degree; it can not decide whether the mistake should be proofread paying great attention or simply be looked over, and thus sufficient efficiency in proofreading is not obtained.

As mentioned above, the apparatus has no function to present further information and information effective to distinguishing one alternative from the other in revising, and therefore merely a person skilled in the art can operate the apparatus. This is the primary cause of inhibiting the spread of this kind of processing apparatus.

On the other hand, in the steps of creating a document, the conventional word processor is manufactured giving priority to inputting and editing functions, and it does not have such functions as presenting a subject, elaborating a plan, coordinating knowledges, etc. in creating a document.

The present invention effectively overcomes the above-mentioned disadvantages by implementing document-proofreading and -creating functions by utilizing information applied to arcs which link correlated retrieving information.

SUMMARY OF THE INVENTION

A document-creating support apparatus according to the present invention comprises input means for inputting character string information and instructions to proofread; editing means functionally connected to the input means, for composing a sentence from the inputted character string information and editing it; output means functionally connected to the editing means, for outputting the edited sentence; proofreading information accumulating means functionally connected to the editing means and including retrieving information hierarchically classified in accordance with every retrieving step, the retrieving information being linked with each other by arcs, and the arcs carrying distinguishing information for distinguishing retrieving information from the other; retrieving means functionally connected to the input means and the proofreading information accumulating means and receiving the instructions to proofread to specify an object to be proofread in the sentence, for retrieving the retrieving information related to the object to be proofread from the proofreading information accumulating means in accordance with the distinguishing information; and proofreading means functionally connected to the retrieving means for selecting one of the retrieving information to replace it with the object to be proofread.

Although, in the present invention, figures and images can be processed similar to the processing of character string, the case where of a character string is provided as an example in the following explanation.

The apparatus of the invention provides different modes of utilization: a mode where the primary object of using this apparatus is to proofread a document and a mode where the primary object is to create a document, and hence two ways of explanation are presented herein as (a) and (b):

(a) To Proofread a Document

A character string inputted by the input device 1 or accumulated by the proofread information accumulating device is looked up in a dictionary, a program or the like to judge whether or not the character string should be proofread.

If the answer is yes, a section which probably has a part to be revised is displayed by output means such as a CRT for the user to check it. In some case, alternatives of the character string which seem to be appropriate are displayed.

The user checks the part which is extracted by the apparatus for revision or the appropriate alternative of the character string, based upon his or her own knowledge, and then proofreads the part with proofreading means.

If the user can not make a decision whether the part should be proofread or not, or which one should be chosen of all the alternatives and wants further information, the present invention provides additional information as required by the user, with the extracted character string linked with information by an arc.

Utilizing distinguishing information applied to the arcs, the user can use retrieving information for user's convenience and in the order as the user likes.

Although the case where the retrieving information is accumulated in advance has been described, the apparatus of the present invention can provide the utilization of retrieving information by adding correct information from outside if the retrieving information is not accumulated.

Thus, presenting the retrieving information enhances the accuracy in proofreading and improves the efficiency in proofreading.

This is helpful for increasing the user's knowledge for proofreading because of the educational effect of the information.

(b) To Create a Document

In order to create a document having some additional value, description on the theme based upon a novel view point or description on unknown things is needed. In the apparatus of the present invention, information can be obtained by linking the things with the related retrieving information by the arcs. The arcs can be used, distinguished in accordance with respective viewpoints or classified in accordance with the precision of the retrieving information.

In this way, information obtained by other media such as books and dictionaries can be accumulated in this apparatus, and thereafter the user can consult the retrieving information as required or extract it to use it in composing some writing.

This enables the user to create a document having satisfactory contents with high efficiency.

As can be seen in the cases (a) and (b), according to the present invention, the user can create and proofread a document, consulting and using the required retrieving information with high efficiency as required by the user, whereby the document can be created and proofread with high accuracy, the efficiency in the work can be improved and educational effect on the user can be expected.

As has been described, the present invention brings about the following advantages because the apparatus provided by the present invention is capable of creating, revising and proofreading a document by successively retrieving information linked by arcs which carry distinguishing information.

First, the distinguishing information which is significant in creating and proofreading a document can be used in accordance with the level of knowledge and the degree of interest of the user. This not only leads to the improved labor efficiency in creating and proofreading the document but also to the satisfactory of the user to the work.

Moreover, in the apparatus of the present invention, the drawback of the conventional document processing apparatus that the result alone is presented is eliminated, and the user can use the retrieving information so far as the user likes to learn the cause and reason which are the background of the retrieving information presented by the apparatus, whereby the document can be accurately created and proofread.

Further, according to the present invention, the user can make the apparatus accumulate any unique retrieving information selected for the user's own convenience and use it, and hence the user can use it as an information coordinating apparatus.

The apparatus of the present invention gives an educational effect on the user because the user can accumulate and consult the retrieving information as he or she requires, whereby the user can use this apparatus as a study device.

DESCRIPTION OF THE DRAWINGS

An embodiment of the invention will now be described by way of example and with reference to the accompanying drawings in which.

DESCRIPTION OF THE PREFERRED EMBODIMENTS

Figure 1:
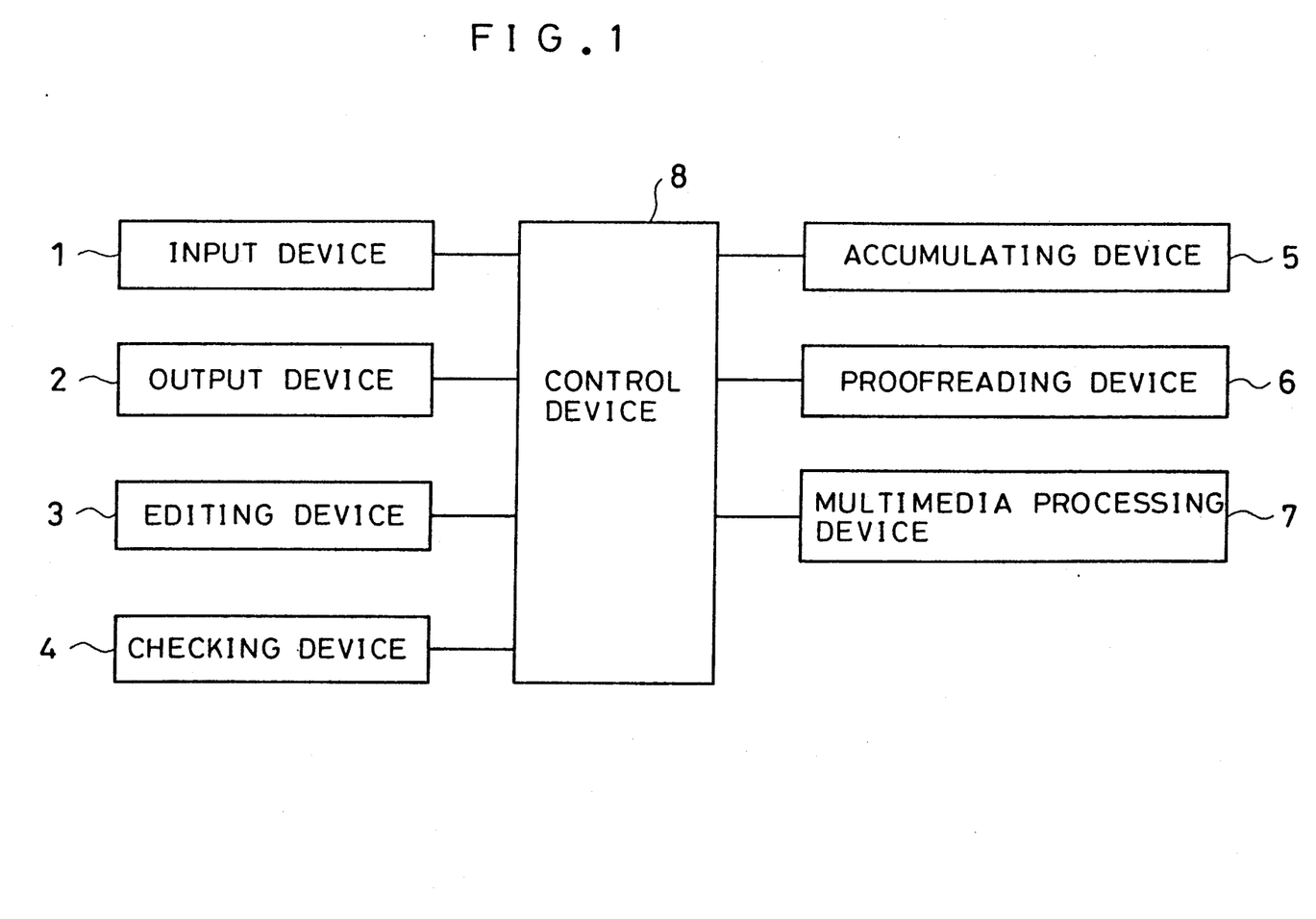
FIG. 1 is a block diagram showing devices composing an apparatus of the present invention.

In FIG. 1, an input device 1 is used for inputting multimedia such as a character string, a figure, an image and a sound and so forth, and it includes a function key for inputting instructions to proofread. An output device 2 may be a printer, a visual display device (such as a CRT or an LCD), a speaker or the like, for outputting the multimedia such as the inputted character string, image, sound and so forth. Editing device 3 is used for editing the inputted multimedia, and it includes a communicating function and a multi-window processing function. A checking device 4 may be a CRT, an LCD or the like, serving as outputting means. With this checking device 4, the inputted character string, the results in the course of a processing, the results of the processing and so forth can be checked on a screen. A proofread information accumulating device 5 (referred to as "accumulating device" hereinafter) is composed of a RAM, a ROM and so forth which store the inputted character string, a dictionary used for analyzing the character string, a program for analyzing, the results of the processing and so forth. A proofreading device 6 is very important in the present invention, and it extracts an inappropriate part from the inputted character string and revises it to be more profound writing. A multimedia processing device 7 converts a character string into a figure or a sound, rotates, magnifies or scales down the figure. A control device 8 such as a CPU controls the devices and serves as retrieving means.

Figure 2:
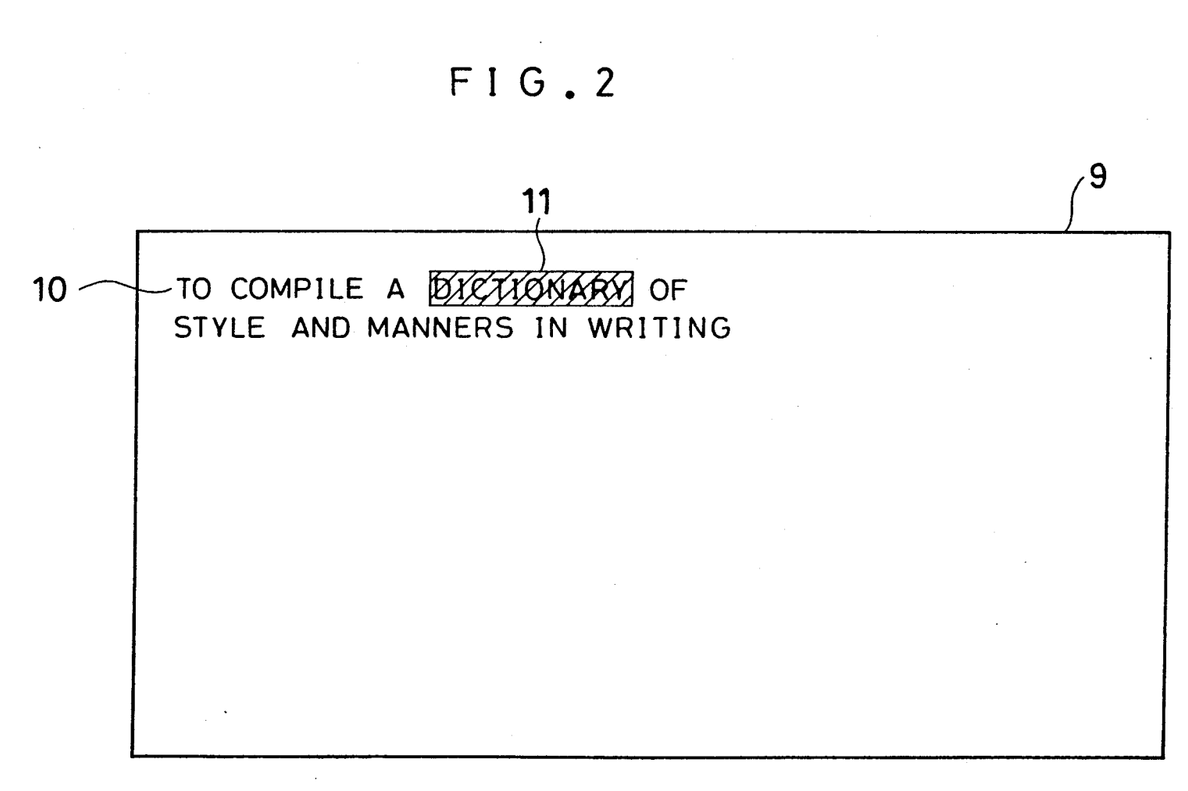
FIG. 2 is a diagram showing an example of a character string and a key word, inputted to and displayed on a checking device shown in FIG. 1.

FIG. 2 is a diagram showing an example of an inputted character string displayed on the checking device 4. A display screen 9 may be a CRT or the like. Reference numerals 10 and 11 denote the inputted character string and a keyword in the character string. The keyword herein means a character string important in proofreading and making a document which are general objects of the apparatus according to the present invention; for example, it may be a word and a phrase possibly to be proofread, or a character string having additional information.

Figure 3:
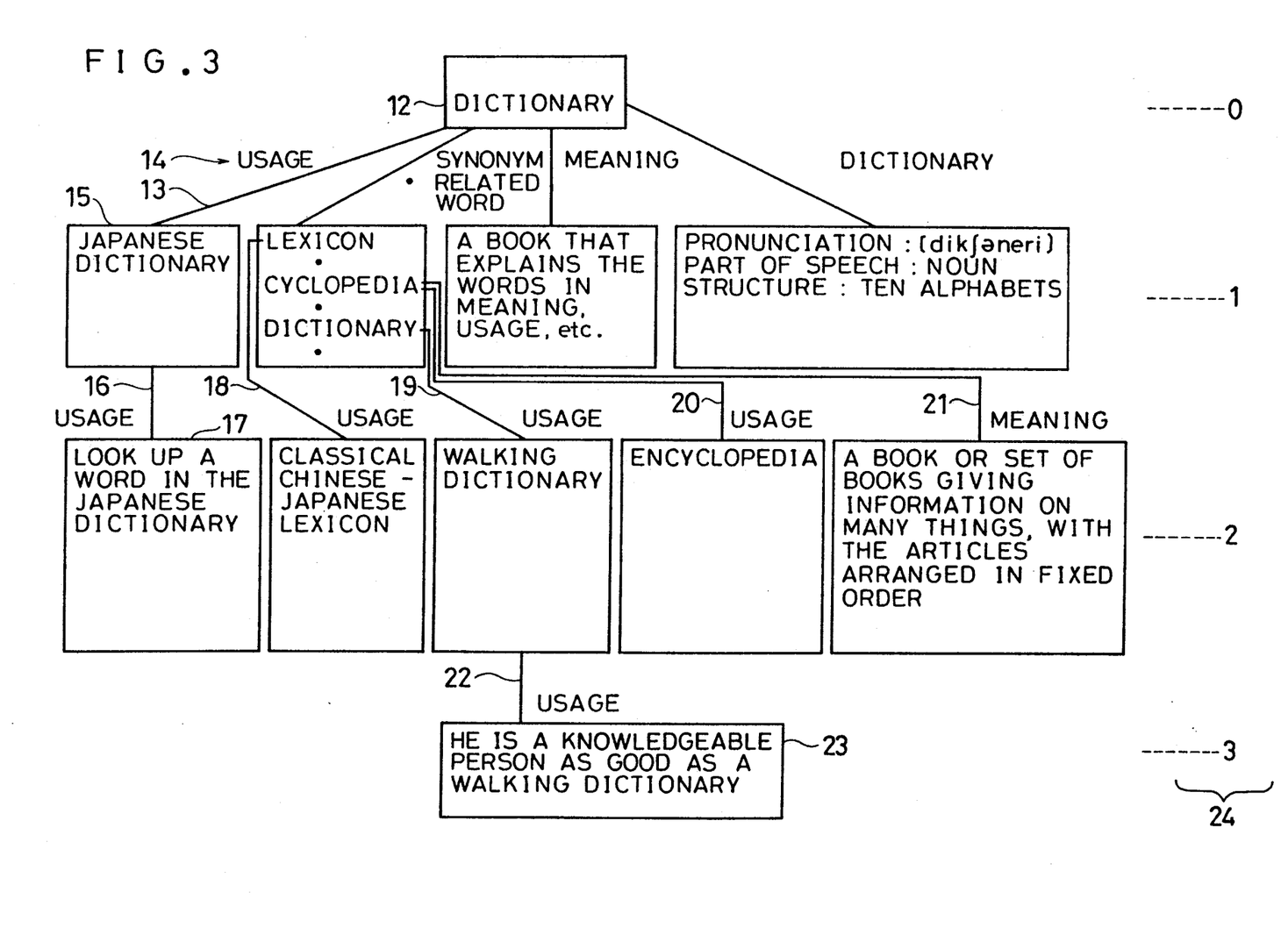
FIG. 3 is a diagram showing a memory organization scheme for retrieving information in the present invention.

FIG. 3 is a diagram showing a memory organization scheme for information retrieving according to the present invention. Reference numeral 12 denotes a low level card having a keyword. As used herein, the term "card" encompasses a memory "record". Arc 13 connects the keyword to the next card. FIG. 3 shows four arcs extending from the card having the keybord. Reference numeral 14 is arc discriminating information. For example, the arc discriminating information branching out from the keyword "dictionary" to "Japanese dictionary" is "usage". FIG. 3 shows discriminating information (e.g., information types) "synonym/related word", "meaning" and "dictionary" other than the "usage". A card 15 at level 1 is linked with the "dictionary" by the arc, "usage". The card 15 stores information of "Japanese dictionary". There exists cards at the ends of the arcs of the "synonym/related word", "meaning" and "dictionary" at the same level. A card 17 at level 2 is linked with the card 15 by the arc 16. Reference numerals 18, 19, 20, 21 denote arcs extending from a card which is linked with the card 12 having the keyword by the arc of "synonym/related word". Those arcs can extend either from the entire card or from a specific keyword as can be seen in FIG. 3. Also, a plurality of arcs can be extend from not only a card but a keyword. An arc 22 extends from a card at level 2 linked with the specific word by the arc 19, where the discriminating information is "usage". A card 23 at level 3 is linked by the arc 22. Reference numeral 24 denotes level information which represents the required number of arcs by which the card having aimed information can be retrieved.

Figure 4:
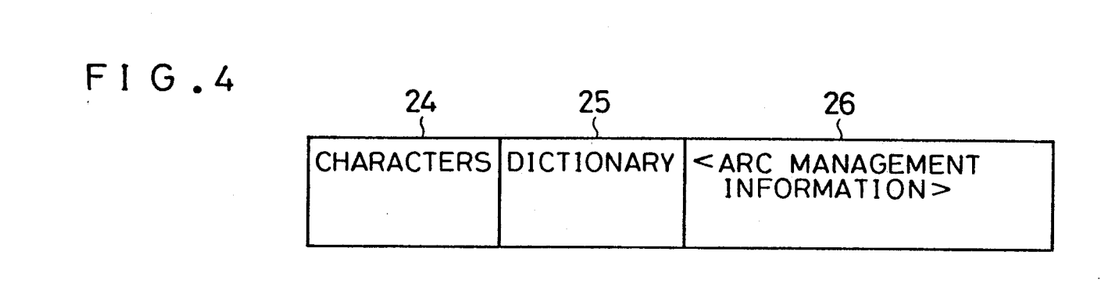
FIG. 4 is a diagram showing a format for a structure of a unit of accumulated information used for implementing the present invention.

FIG. 4 is a diagram showing the format of a structure or record of a unit of accumulated information used for implementing the present invention. Reference numeral 24 denotes information which represents the kinds of media to be made by the apparatus of the present invention. Herein, the explanation will be given with an example of a character string as one of the media. Reference numerals 25 and 26 designate the character string field and arc management information field, respectively.

Figure 5:
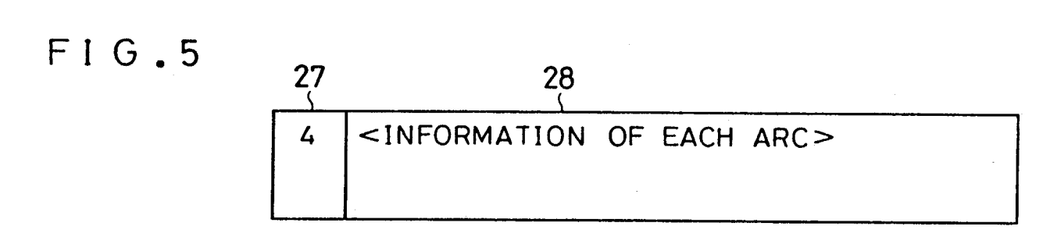
FIG. 5 is a diagram showing a format for an internal structure of arc management information in FIG. 4.

FIG. 5 is a diagram showing the format of the internal structure of the arc management information field. Reference numeral 27 denotes a subfield having information which represents the number of arcs, and numeral 28 denotes a subfield having information on each arc.

Figure 6:
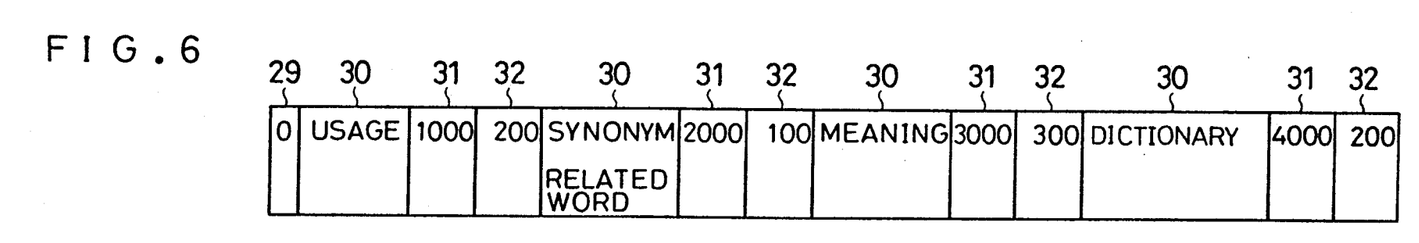
FIG. 6 is a diagram showing a format for an internal structure of arc information in FIG. 5.

FIG. 6 is a diagram showing one format of the internal structure of the arc information subfield 28. Reference numerals 29 and 30 denote arc level information and arc discriminating information, respectively. Reference numeral 31 denotes a pointer to the next card, and numeral 32 denotes information which represents the amount of information of the card pointed by the pointer 31.

Figure 7:
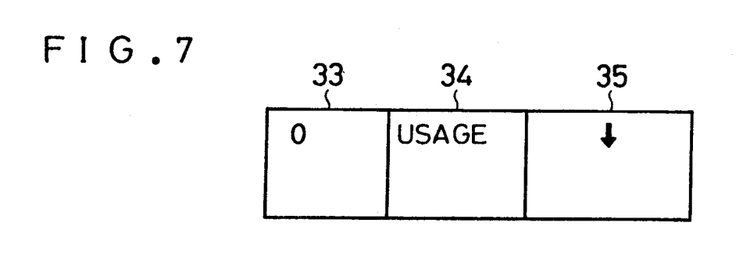
FIG. 7 is a diagram showing a format for information used for checking which level of information and which information in them the apparatus of the present invention is retrieving.

FIG. 7 is a diagram showing one format of the structure of information for checking which level of information and which information in them is being retrieved. Reference numeral 33 denotes information representing the level of the arc which is being retrieved. Information 35 represents the direction of the retrieving.

Figure 8:
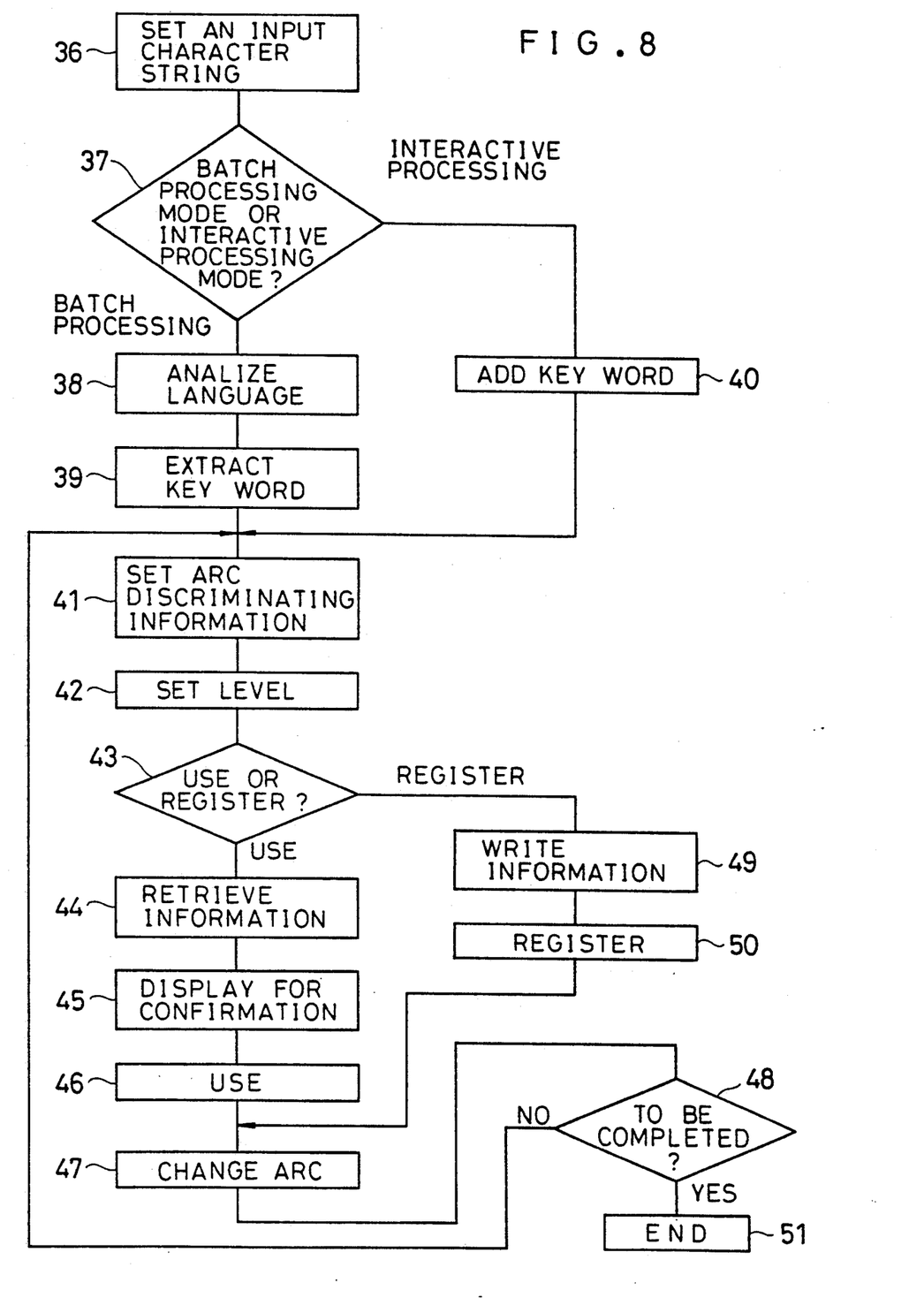
FIG. 8 is a schematic flow chart showing a process of the embodiment.

FIG. 8 is a schematic flow diagram of the present invention. A processing module 36 sets a document inputted by the input means. A processing module 37 determines whether the processing is to be carried out in a batch processing mode or an interactive processing mode. Depending on the mode, the processing proceeds differently. In the batch processing mode, a processing module 38 for language analysis starts. This module 38 performs morphology analysis, structure analysis, meaning analysis, context analysis and so forth to prepare data available for extracting a part to be revised and a keyword carrying related information. A module 39 extracts a keyword carrying related information by using the results obtained by the analyzing process through the module 38. This module includes processes such as storing and indicating the part to be extracted. If the interactive processing mode is determined by module 37, a processing module 40 sets a keyword for getting related information. A processing module 41 sets the kind of arc for connecting the keyword and the related information. A processing module 42 sets the level that the related information is retrieved so far. A processing module 43 judges whether the user uses information for perusal, proofreading or the like or for registering it. A processing module 44 appears when the information is used for perusal, proofreading or the like, and retrieves the related information by tracing arcs from a keyword. This processing includes steps of analyzing the displayed information with regard to language, extracting a keyword having related information and displaying it. A module 45 displays the related information retrieved on a window or the like. A processing module 46 is used for taking the displayed information into the original document, proofreading it and editing it. A processing module 47 resets the arc to other kind or level of arc when information other than the information obtained above is required. A processing module 48 judges whether or not the information is still required.

The registration in the processing module 43 is carried out according to the following processing flow. A processing module 49 inputs information to be recorded. A processing module 50 writes inputted information into a buffer, sorts the information for improving retrieving efficiency, and arranges inputted information into an execution type memory structure. The registering process may be collectively carried out after related information is temporarily written in the buffer and a sequence of steps are completed. A processing module 51 makes a decision of completion of the sequence of steps.

The case where the present invention is applied to the proofreading processing with reference to the above-mentioned processing flow. As an example of a inputted sentence, " 文章作法辞典を著す (To compile a dictionary of style and manners in writing)" is shown in FIG. 2.

The inputted sentence " 文章作法辞典を著す (To compile a dictionary of style and manners in writing)" is set. Herein, "to set" means that the control device 8 reads the inputted sentence to analyze the language of the sentence. Then the processing module 37 chooses either the interactive processing mode or the batch processing mode. Information representing the selection of the interactive processing mode may be set in advance. These methods are practiced according to the way in a general document creating apparatus. Herein, the case where the batch processing mode is selected will be discussed.

The inputted sentence 10 is subjected to language analysis by an analyzing module. This analysis gives various information that a noun " 辞典 " which is an independent word succeeds nouns " 文章 " and " 作法 " and is succeeded by an adjunctive word " を ", which is succeeded by a verb " 著す " (a noun "dictionary" succeeds an infinitive phrase "to compile" and is succeeded by a preposition "of", which is succeeded by a phrase which, in turn, is made up of two nouns, "style" and "manners", and a conjunction "and" joining those two nouns, which is succeeded by an adjective phrase "in writing" made up of a particle "in" and a noun "writing", and so forth). Now the information included in a block 25 shown in FIG. 4 is retrieved, and consequently it is found that the character string "dictionary" has related information and may be a keyword. According to the conclusion, the keyword 11 is marked with oblique lines in FIG. 2.

Then, the keyword 11 is collated with arc management information shown in FIGS. 5 and 6. As a result of the collation, if a field 27 in the arc management information is not "0", a procedure to select the following arc is carried out. Such are processing modules of an arc distinguishing information setting step 41 and a level setting step 42. First, in the input device 1, a function key 1 or a mouse is manipulated to display the arc management information.

Figure 9:
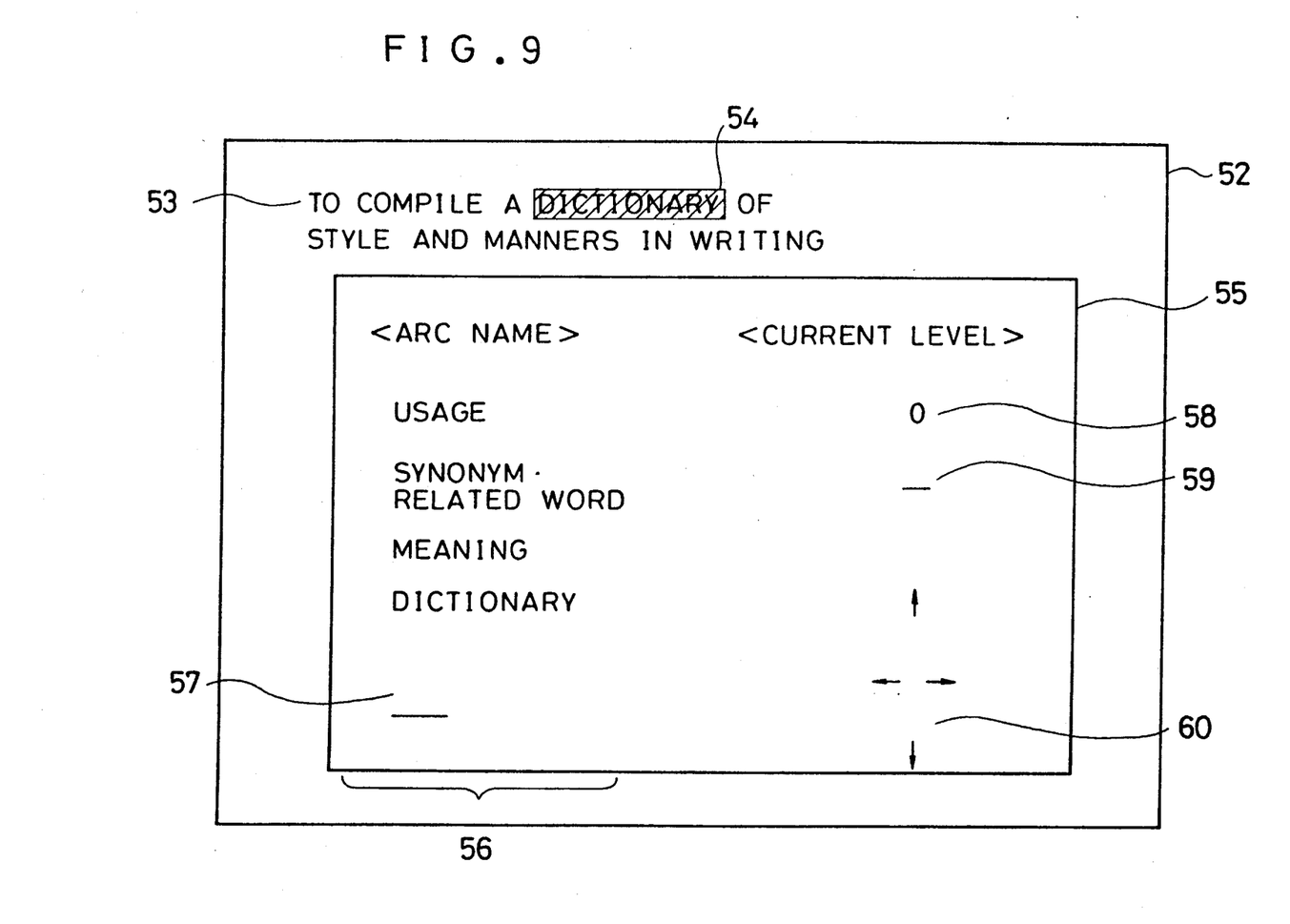
FIG. 9 is a diagram showing an example of a display screen used for selecting an arc.

FIG. 9 shows a display screen menu for selecting arcs, which is obtained by manipulating the function key. Reference numeral 52 denotes the entire screen of the display device, 53 denotes an inputted character string, and 54 denotes a keyword. A window 55 is used for setting the arc management information, and arc distinguishing information 56 is presented in the window 55. Reference numeral 57 denotes a component of the information 56 which is used for adding a further arc. The window 55 also includes information 58 showing the current level and an input position 59 of the information for forcibly specifying the level. A guide marks 60 is used in deciding which direction the retrieving information is retrieved. The marks ↑, ↓, → and ← are used in retrieving an arc downward by one level, upward by one level, and retrieving other arcs at the same level, respectively.

Now, not the registration of the information but the reference to the information will be discussed. A cursor or the mouse is used for selecting "usage" in the arc distinguishing information (the kinds of arcs), and then ↓ of the marks 60 is selected, the card 15 shown in FIG. 3 can be retrieved. This is the processing by the processing module 47. This step is implemented as follows: First, referring to 27 in FIG. 5, it is found that there exist four arcs. Then, referring to 30 in FIG. 6, it is recognized that there exist arcs, "usage", "synonym/related word", and "dictionary". Distinguishing information 56 in FIG. 9 shows the retrieving information. Referring to FIG. 6, it is found that the current level is "0". The information 58 in FIG. 9 shows this, and the level "0" is written into the information 33 in FIG. 7. When the "usage" of the distinguishing information 56 is selected by the cursor or the mouse, it is written in the information 34 for distinguishing the arc which is being retrieved. When ↓ of the guide marks 60 is selected, it is written in the retrieving direction information 35, and the retrieving information on the position shown by the pointer 31 to the next record is displayed by the amount corresponding to that of the information 32. In this case, the contents to be displayed is the record 15. In this way, the retrieving information can be successively retrieved and checked. This step corresponds to the steps 44, 45 shown in FIG. 8.

Next, the processing module for using the information for perusal, proofreading, or the like will be described. As shown in FIG. 2 or FIG. 9, this step begins due to the pointing out that the representation "dictionary" in "a dictionary of style and manners in writing" may probably be incorrect, and as an effort to get information on whether it is correct or not. For example, after the reference to the retrieved information of the record 15, "Japanese dictionary", if it can be judged whether or not "a dictionary of style and manners in writing" is correct, retrieval of the retrieving information is completed, and the proofreading step for "dictionary" of "a dictionary of style and manners in writing" can be completed with or without correction.

If the decision whether it is correct or not in the above-mentioned steps cannot still be made with the above-mentioned procedure, the retrieving information at higher level is sought or it is investigated again from another point of view.

Specifically, the retrieval beginning with the record 15 is traced to the arc 16 to obtain the retrieving information of the recard 17, or is traced back to the record 12 and then to another arc such as that of "synonym/related word" so as to search for synonyms and related words and further for the usage of them.

Now, assume that "cyclopedia" is appropriate for such a book as "a dictionary of style and manners in writing". This decision may be made only when the record linked by the arc of "meaning" which extends from "cyclopedia" at level 1 is obtained. Then, selecting a function key for proofreading allows the apparatus to trace one arc upward to "cyclopedia", and tracing one arc upward allows the apparatus to replace "dictionary" with "cyclopedia".

A keyword adding module 40 shown in FIG. 8 adds retrieving information when "dictionary" carries no retrieving information, for example. It is apparent from the processing step 37 that this is a mode for newly adding a keyword. On conducting this mode, a part to be the keyword can be selected by the cursor or the mouse. The window for the arc information is opened to write the aimed or targeted arc distinguishing information in the position 57 of the kinds of arcs. Then, ↓ is selected, another window for writing a sentence is displayed. The aimed sentence is written therein.

Figure 10:
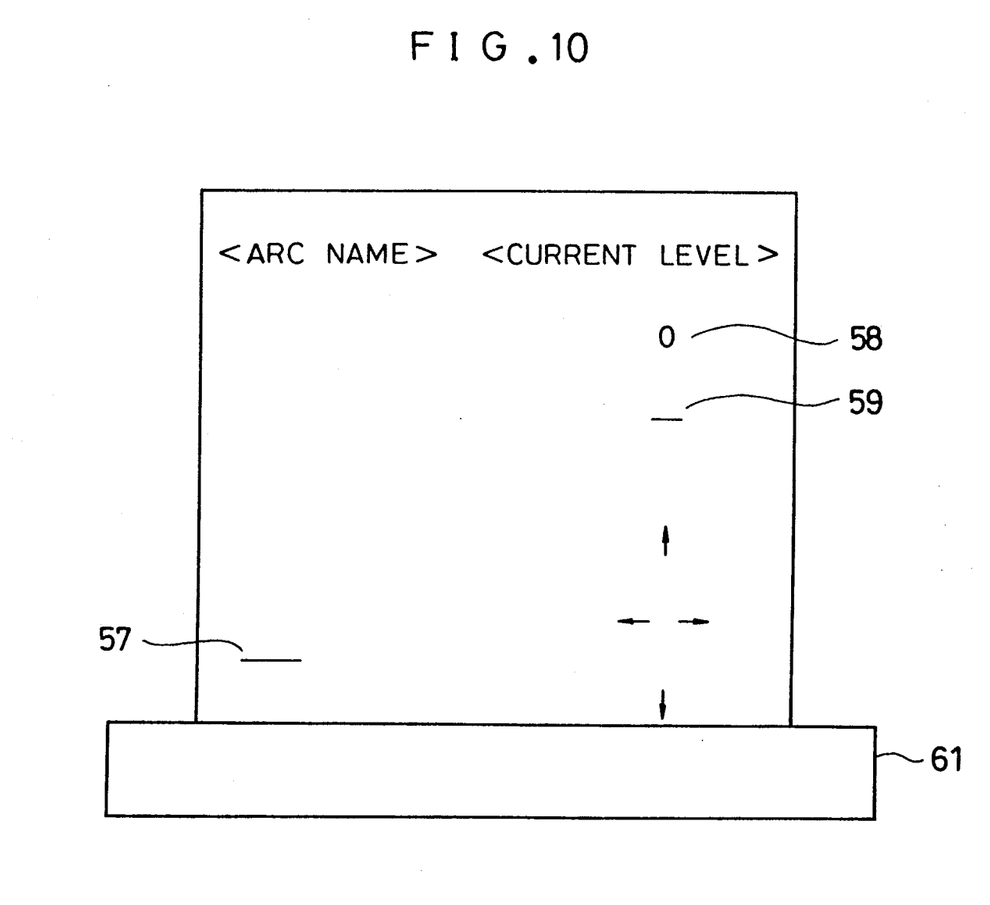
FIG. 10 is a diagram showing a window for writing information.

FIG. 10 shows a window to which information is written, and reference numeral 61 denotes the window for information writing. The processing module 50 writes the retrieving information to buffers shown in FIGS. 4, 5 and 6, respectively. This allows the apparatus to accumulate the related retrieving information. With the above-mentioned method, the user can trace the related information as required to proofread and revise a document.

With a registration function of the present invention, the retrieving information can be accumulated for the convenience of the user. In creating the document, the apparatus of the present invention may be used as an encyclopedia in retrieving information; a required part can be taken in the inputted sentences to compose an elaborate document. Since the procedure in practically creating the document is the same as in proofreading the document, the explanation is omitted. When multimedia information other than the character string is processed, the media information 24 shown in FIG. 4 is used for distinguishing it from other, and the multimedia processing device 7 shown in FIG. 1 processes it for display and so forth. However, with regard to use of the retrieving information for retrieving, any multimedia information may get the same deal as the character string explained in this embodiment, and hence the explanation is omitted.

Although an example in Japanese is used for explaining the function of proofreading supporting in this embodiment, it should be understood that the present invention is applicable to a sentence written in various languages other than Japanese.

What is claimed is:

1. A document-creating support apparatus, comprising:

input means for inputting a character string to be proofread;

editing means functionally connected to said input means for producing an edited sentence;

proofread information accumulating device functionally connected to said editing means and including a memory having retrievable information stored therein according to a multi-level hierarchical classification, said retrievable information being stored in records which are linked in the memory by arcs, each arc having both a pointer to a memory location, an indication of an information type stored at the memory location pointed to by the pointer, and an indication of a level in said multi-level hierarchical classification;

retrieving means functionally connected to said input means and said proofread information accumulating device for receiving said character string to proofread, for specifying a keyword to be proofread in said character string, for retrieving retrievable information related to said keyword from said proofread information accumulating device in accordance with an information type; and proofreading means functionally connected to said retrieving means for selecting retrievable information to replace the keyword.

2. An apparatus according to claim 1, wherein said proofreading information accumulating means is a random access memory to which said information type can be written.

3. A document-creating support apparatus, comprising:

input means for inputting a character string to be proofread;

editing means functionally connected to said input means for producing an edited sentence;

proofread information accumulating device functionally connected to said editing means and including a memory having retrievable information stored therein according to a hierarchical classification, said retrievable information being stored in records which are linked in the memory by arcs, each arc having both a pointer to a memory location and an indication of an information type stored at the memory location pointed to by the pointer;

retrieving means functionally connected to said input means and said proofread information accumulating device for receiving said character string to proofread, for specifying a keyword to be proofread in said character string, for retrieving retrievable information related to said keyword from said proofread information accumulating device in accordance with an information type;

proofreading means functionally connected to said retrieving means for selecting retrievable information to replace the keyword, and figure input means for inputting figure information indicative of an inputted figure; processing means for processing said inputted figure to obtain a processed figure; and figure outputting means for outputting said processed figure.

4. A document-creating support apparatus, comprising:

input means for inputting a character string to be proofread;

editing means functionally connected to said input means for producing an edited sentence;

proofread information accumulating device functionally connected to said editing means and including a memory having retrievable information stored therein according to a hierarchical classification, said retrievable information being stored in records which are linked in the memory by arcs, each arc having both a pointer to a memory location and an indication of an information type stored at the memory location pointed to by the pointer;

retrieving means functionally connected to said input means and said proofread information accumulating device for receiving said character string to proofread, for specifying a keyword to be proofread in said character string, for retrieving retrievable information related to said keyword from said proofread information accumulating device in accordance with an information type;

proofreading means functionally connected to said retrieving means for selecting retrievable information to replace the keyword, and sound inputting means for inputting sound information as inputted sound information; processing means for converting said inputted sound information into a processed sentence; and sound outputting means for outputting said processed sentence as a sound.

5. A document-creating support apparatus, comprising:
- input means for inputting a character string to be proofread;
- editing means functionally connected to said input means for producing an edited sentence;
- proofread information accumulating device functionally connected to said editing means and including a memory having retrievable information stored therein according to a hierarchical classification, said retrievable information being stored in records which are linked in the memory by arcs, each arc having both a pointer to a memory location and an indication of an information type stored at the memory location pointed to by the pointer;
- retrieving means functionally connected to said input means and said proofread information accumulating device for receiving said character string to proofread, for specifying a keyword to be proofread in said character string, for retrieving retrievable information related to said keyword from said proofread information accumulating device in accordance with an information type, wherein said retrievable information is classified in accordance with level information which represents how many arcs point to a desired record of retrievable information; and
- proofreading means functionally connected to said retrieving means for selecting retrievable information to replace the keyword.

6. A document-creating support apparatus, comprising:
- input means for inputting a character string to be proofread;
- editing means functionally connected to said input means for producing an edited sentence;
- proofread information accumulating device functionally connected to said editing means and including a memory having retrievable information stored therein according to a hierarchical classification, said retrievable information being stored in records which are linked in the memory by arcs, each arc having both a pointer to a memory location and an indication of an information type stored at the memory location pointed to by the pointer;
- retrieving means functionally connected to said input means and said proofread information accumulating device for receiving said character string to proofread, for specifying a keyword to be proofread in said character string, for retrieving retrievable information related to said keyword from said proofread information accumulating device in accordance with an information type;
- proofreading means functionally connected to said retrieving means for selecting retrievable information to replace the keyword, and
- output means for displaying said character string, keyword and retrievable information, said output means including a visual display device.

7. A method for editing input information, the method comprising:
- receiving input information and selecting therefrom a keyword for editing;
- locating a record in a memory having the keyword of the input information stored therein and referencing such record as a first level record;
- accessing the first level record having the keyword stored therein to determine the location in the memory of higher level records and information types of the higher level records, the higher level records having stored therein explanatory information for the keyword in accordance with the information types of the higher level records, the higher level records being of a plurality of information types for presenting different types of explanatory information regarding the keyword;
- providing an indication of the information types stored in the memory for the keyword;
- receiving an indication of a selected information type; and
- providing the explanatory information stored in the higher level record of the selected information type thereby facilitating an editing decision whether the keyword is properly used in the input information.

8. The method of claim 7, further comprising:
- replacing the keyword in the input information with the explanatory information.

9. The method of claim 7, wherein one information type is an example of usage of the keyword.

10. The method of claim 7, wherein one information type is a synonym of the keyword.

11. The method of claim 7, wherein one information type is a definition of the keyword.

12. The method of claim 7, wherein one information type is a dictionary entry for the keyword.

13. The method of claim 7, further comprising:
- receiving explanatory information pertaining to the keyword and storing the received explanatory information in the memory.

14. The method of claim 7, further comprising storing in the first level record an indication of the media from which the input information was received.

15. An apparatus for editing input information, the apparatus comprising:
- means for receiving input information and selecting therefrom a keyword for editing;
- a memory having records stored therein including first level records and higher level records;
- means for locating in the memory the location of a first level record having the keyword stored therein;
- means for accessing the first level record having the keyword stored therein to determine the location in the memory of higher level records and information types of such higher level records, the higher level records having stored therein explanatory information for the keyword in accordance with the information types of the higher level records, the higher level records being of a plurality of information types for presenting different types of explanatory information regarding the keyword;
- means for providing an indication of the information types stored in the memory for the keyword;
- means for receiving an indication of a selected one of the information types; and
- means for providing the explanatory information stored in the higher level record of the selected information type thereby facilitating an editing decision whether the keyword is properly used in the input information.

16. The apparatus of claim 15, wherein one information type is an example of usage of the keyword.

17. The apparatus of claim 15, wherein one information type is a synonym of the keyword.

18. The apparatus of claim 15, wherein one information type is a definition of the keyword.

19. The apparatus of claim 15, wherein one information type is a dictionary entry for the keyword.

20. The apparatus of claim 15, further comprising:
means for receiving explanatory information pertaining to the keyword and for storing the received explanatory information in the memory.

* * * * *